United States Patent
Geerling

[15] 3,701,993
[45] Oct. 31, 1972

[54] RAMP GENERATOR A CHART RECORDER

[72] Inventor: Leonardus Johannes Geerling, Beaverton, Oreg.

[73] Assignee: Tektronix, Inc., Beaverton, Oreg.

[22] Filed: June 28, 1971

[21] Appl. No.: 158,922

[52] U.S. Cl..................346/33 R, 346/136, 328/185
[51] Int. Cl. ........................................................G01d
[58] Field of Search .....346/33 R, 33 EC, 33 F, 33 B, 346/136, 113, 76; 328/185; 324/57 PS

[56] References Cited

UNITED STATES PATENTS 2,712,128    6/1955    Woodruff..................346/33 R
3,175,161    3/1965    Hackborn et al. ........346/33 R Primary Examiner—Joseph W. Hartary
Attorney—Adrian J. LaRue et al.

[57] ABSTRACT

A ramp generator for a chart recorder or the like and a chart recorder for permanently recording information on recording media by sampling means for sampling signals is described. The ramp generator generates a ramp signal whose magnitude gradually changes in response to movement of the recording media rather than time. The ramp signal thus derived is applied to a strobe comparator via a slow ramp control circuit as the reference level thereof for producing a strobe pulse to drive the sampling gate and thereby sampling a signal applied thereto.

8 Claims, 5 Drawing Figures

INVENTOR: LEONARDUS JOHANNES GEERLING

RAMP GENERATOR A CHART RECORDER

BACKGROUND OF THE INVENTION

The present invention relates to a ramp generator for a chart recorder or the like and a chart recorder for recording information on a recording media by sampling means for sampling signals. This type of sampling is frequently employed in a measuring instrument such, for example, as a cathode ray tube oscilloscope in order to provide high frequency measuring capability by reducing the frequency bandwidth.

In a conventional measuring instrument such as a cathode ray tube oscilloscope, a strobe comparator is employed for producing an output when a fast ramp signal applied to one input terminal of the comparator coincides with a slow ramp signal or a staircase signal applied to the other input terminal thereof so as to produce samples of the input signal each delaying gradually in relation to the occurrence of a repetitive input signal. In a cathode ray tube oscilloscope, the slow ramp signal is also utilized as a horizontal sweep signal for deflecting the electron beam of the cathode ray tube. Therefore, there is no possibility to cause error between the time when signal sampling is taking place and the electron beam position on a phosphor screen of the cathode ray tube.

On the other hand, in a chart recorder wherein the time duration depends on the motor speed for moving the recording media such, for example, as paper, an independent slow ramp signal should be generated in order to obtain correct samples. However, the motor speed tends to change during operation in accordance with friction, power source, load condition and other conditions that would cause the motor speed to be nonuniform. Also the slow ramp generator may change its output because of variation of the power source and circuit components. Accordingly, it is desirable to obtain a slow ramp signal whose magnitude follows the movement of the recording media or the motor for driving the recording media.

SUMMARY OF THE INVENTION

According to the present invention, the slow ramp generator is precisely controlled by the movement of the recording media itself throughout the entire movement thereof. That is, there is employed a means for detecting both of the speed and the position of the recording media. The means may consist of a pulse generator for generating pulses of a predetermined duration having a repetition rate directly proportional to the movement of the recording media or the motor, a pulse counter for counting the number of pulses generated by the generator, and a digital-to-analog converter for converting the output from the pulse counter to an analog signal. The repetition rate of the pulses produced from the pulse generator corresponds to the speed of the recording media. On the other hand, the output from the digital-to-analog converter represents the total movement of the recording media. Then the output from the digital-to-analog converter is compared with a slow ramp signal generated by a slow ramp generator consisting, for example, of a miller integrator. An error signal derived from the error comparator is then fed back to the slow ramp generator so that the slow ramp generator generates a slow ramp signal having an identical slope as that of the output from the digital-to-analog converter. This construction ensures precise measuring accuracy of the chart recorder.

It is therefore one object of the present invention to provide a ramp generator for a chart recorder or the like wherein the output therefrom precisely follows the movement of the recording media.

It is another object of the present invention to provide a chart recorder operated by sampling means for sampling signals.

It is still another object of the present invention to provide an improved chart recorder including a ramp generator whose output is precisely controlled by the movement of the recording media.

It is yet another object of the present invention to provide improved time domain reflectometry circuitry which can record the signal transmission characteristic of a transmission line on the recording media.

The subject matter which I regard as my invention is particularly pointed out and distinctly claimed in the concluding portion of this specification. The invention, however, both as to organization and description of operation, together with further advantages and objects thereof, may best be understood by reference to the following description taken in connection with the accompanying drawings wherein like reference characters refer to like elements.

DETAILED DESCRIPTION OF THE PREFERRED EMBODIMENT

Figure 1:
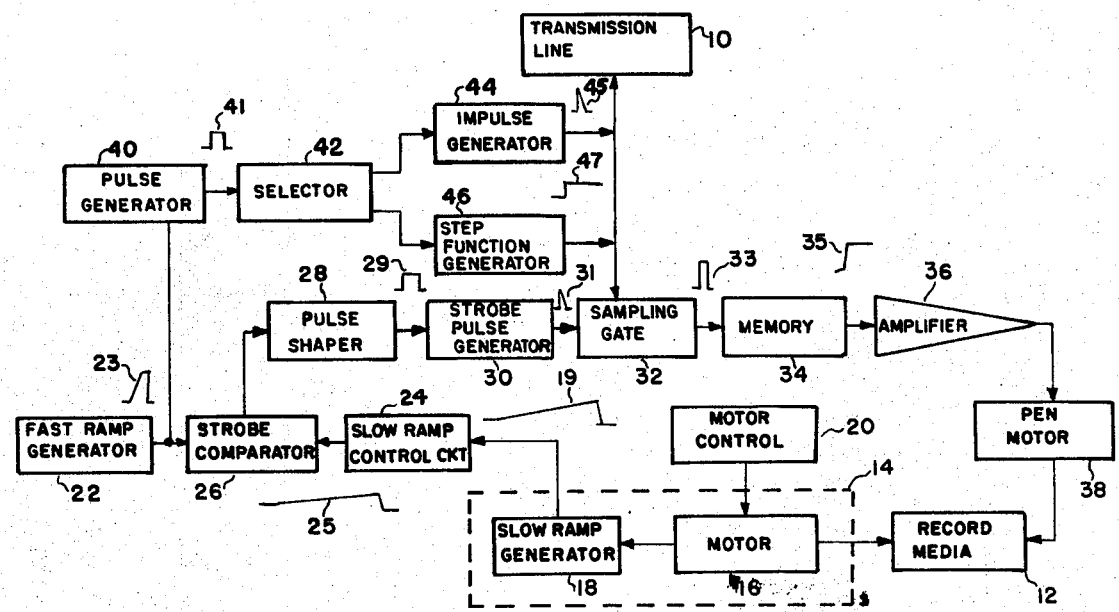
FIG. 1 is a block diagram of one embodiment of a chart recorder according to the present invention.

Referring to FIG. 1 illustrating a block diagram of one embodiment of the present invention applied to time domain reflectometry for measuring signal propagation characteristics of a high frequency transmission line, a transient response of an electronic apparatus and so on, a device 10 represents, for example, a coaxial cable for transmitting television signals, which is to be tested. The characteristics of the coaxial cable 10 will be recorded on a recording media 12, for instance, made of a paper having a plurality of a parallel horizontal and vertical lines respectively printed thereon and thereby defining a chart. A circuit 14 represents an important portion of the present invention including a driving mechanism 16 for driving the recording media 12 and a slow ramp generator 18 for generating a slow ramp signal 19 synchronized with the movement of the recording media 12, details of which will be described hereinafter when referring to FIG. 2. A motor control circuit 20 controls the operation of the driving mechanism 16 and the other circuits, which is described and claimed in copending U.S. Pat. application, Ser. No. 158,923 filed June 28, 1971 by the same inventor and assigned to the present assignee.

A fast ramp generator 22 generally defining a capacitor and a constant current source generates a fast ramp signal 23 having a faster slope than the slow signal 19 from the slow ramp generator 18. The fast ramp generator 22 may be triggered by an astable multivibrator. A slow ramp control circuit 24 controls the amplitude and dc offset level of the slow ramp signal 19. A strobe comparator 26 receives the fast ramp signal 23 and the slow ramp signal 25 from the slow ramp control circuit 24. The strobe comparator 26 produces an output signal when the fast ramp signal 23 exceeds the reference lever or the slow ramp signal 25. The amplitude of the slow ramp signal 19 is selected to be the same as that of the fast ramp signal 23, however that of the slow ramp signal 25 may be attenuated selectably, for example, by the factor of 2.5, 10, 25, 100 and 250. Moreover, the dc level of the slow ramp signal 25 may be adjusted to any level within the minimum and maximum value of the fast ramp signal 23 by selecting the dc offset level provided in the slow ramp control circuit 24.

The output signal from the strobe comparator 26 is then fed to a conventional pulse shaper 28 including, for example, snap diode circuitry. A strobe pulse generator 30, also of conventional design, is provided to produce a strobe pulse 31 of extremely short time duration upon receiving an output signal 29 from the pulse shaper 28. A sampling gate 32 including diode means transmits a sample pulse 33 to a memory 34. Pulse 33 has a magnitude corresponding to that of the input signal at the instance when the sampling gate 33 is driven to open by the strobe pulse 31. The memory 34, generally including a capacitor, stores the peak value of the sample 33 until the next sample is taken. The signal 35 stored in the memory 34 is then amplified to a sufficient magnitude by a conventional amplifier 36 so that the pen motor 38 records the input information on the recording media 12. Subsequent sampling signal 35 will drive the pen motor 36 to record a succeeding line according to the magnitude of the sampling signal 35 thereby recording a waveform representative of the signal being sampled.

A pulse generator 40 generates a pulse 41 in synchronism with the generation of the fast ramp signal 23. The pulse generator 40 may be of conventional comparator configuration to produce the pulse 41 when the fast ramp signal 23 exceeds a predetermined value in order to avoid timing nonlinearity, due to the nonlinearity of the fast ramp signal 23 at the leading edge thereof. The output 41 from the pulse generator 40 is then applied to a pulse selector 42 which includes a switching circuit to impress repetitive impulse signal 45 from an impulse generator 44 or step function signal 47 from a step function generator 46 to the coaxial cable 10.

As the reference level or the slow ramp signal 25 applied to the reference input terminal of the comparator 24 changes gradually in response to the movement of the recording media 12, the strobe comparator 26 produces output pulses at sequentially delaying time intervals in relation to the occurrence of the fast ramp signal 23, the impulse signal 45 and the step function signal 47. Accordingly, the signal propogation characteristics of the coaxial cable 10 will be recorded on the recording media 12. If there is a discontinuity in the characteristic impedance somewhere along the coaxial cable 10, signal reflection from the point will be recorded on the recording media 12. The time difference on the chart paper or the recording media 12 between the application of the repetitive input signal 45 or 47 to the coaxial cable 10 and the receipt of the reflected signal is equivalent to twice as long as the time interval for electricity propagating from the input end of the coaxial cable 10 to the point causing the signal reflection. The propagation speed of electricity in meters per second along a transmission line is given by the following expression:

$$Vp = \frac{C}{\sqrt{\epsilon}}$$

Where, $Vp$ = propagation speed, $C$ = speed of light and $\epsilon$ = dielectric constant.

Assuming that the time interval on the chart paper 12 between the aforementioned two points is T, the location of the discontinuity or the distance L thereof in meters from the input end of the coaxial cable 10 will be given by the following expression:

$$L = \tfrac{1}{2} V p T = \frac{CT}{2\sqrt{\epsilon}}$$

Therefore the defective location of the coaxial cable 10 will be directly proportional to the time T, and the horizontal axis may be scaled by the length of the coaxial cable 10 rather than taking into consideration the dielectric constant of the insulative material of the coaxial cable 10. The compensation for a different insulative material can be made by adjusting the gain of the slow ramp control circuit 24.

Figure 2:
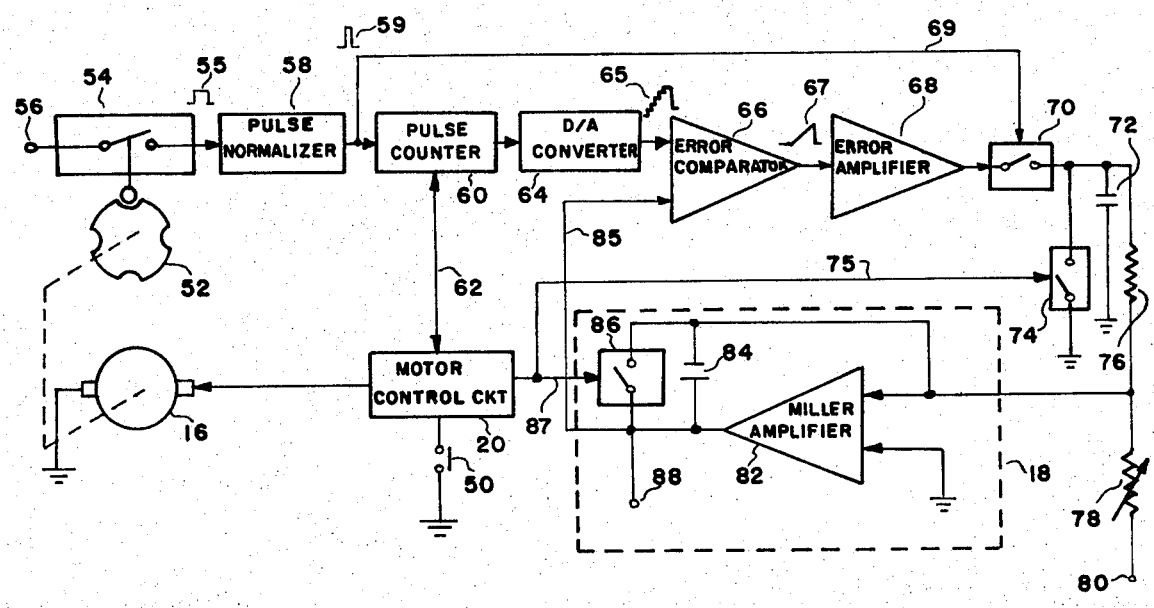
FIG. 2 is a detailed block diagram of the slow ramp generator and the recording media driving circuit in FIG. 1.

FIG. 2 illustrates a block diagram of the circuit 14 of FIG. 1, and the description of the operation of the slow ramp generator 18 will be given in greater detail. A motor 16, which is preferably dc, is employed to drive the recording media 12 in FIG. 1, and it is controlled by motor control circuit 20. A start switch 50 energizes the motor 16 for moving the recording media 12. A cam 52 coupled to the motor 16 actuates a pulse generator 54 comprising, for example, a microswitch connected between a suitable voltage source 56 and a pulse normalizer 58. The pulse normalizer 58 may be a monostable multivibrator for producing pulses 59 having a fixed pulse width, for example, 10 ms upon receiving the pulse 55. The can 52 may be formed either with equally-spaced hollows or projections provided on a surface of a wheel. A pulse counter 60 consists of a plurality of binary counter stages for counting the number of input pulses. The pulse counter 60 has the capability to count at least the number of points for calibrating the slow ramp signal 19. In the case of fifty calibrating points, the pulse counter 60 may have six binary counter stages. The motor control circuit 20 also supplies a reset signal to the pulse counter 60 through a control line 62 whenever the start switch 50 is closed to start the motor 16. Also, the motor control circuit 20 automatically stops the motor 16 when the pulse counter 60 counts a predetermined number, for example, 60.

Figure 5:
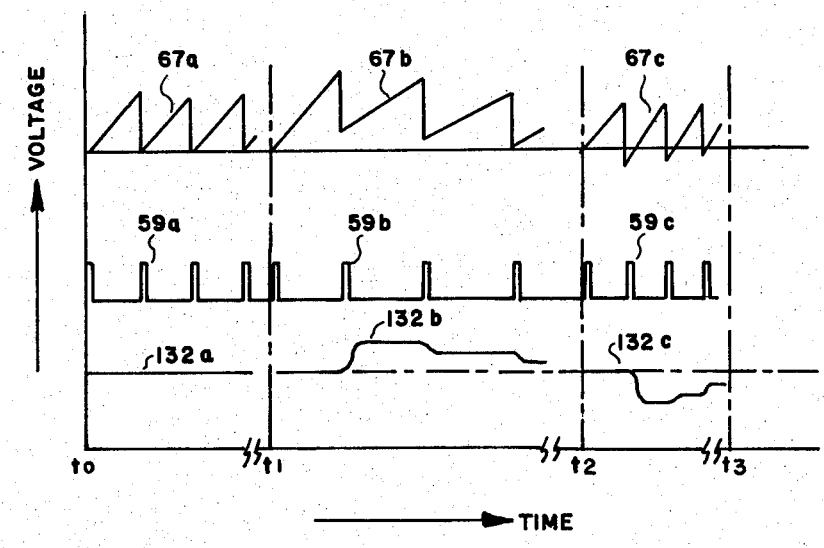
FIG. 5 is a graph of waveforms for explaining the operation of the present invention.

A digital-to-analog converter 64 converts a digital output from the pulse counter 60 to an analog output 65 of a staircase configuration having as many steps as the calibrating points of the slow ramp signal 19, for example, fifty steps. The staircase signal 65 is connected to a reference input terminal of an error comparator 66 as the reference signal. The slow ramp signal 19 from the slow ramp generator 18 is applied to an input terminal of the error comparator 66. The error output signal from the error comparator, which is explained hereinafter in greater detail in conjunction with FIG. 5, is amplified by an error amplifier 68 and stored in a memory capacitor 72 through a switching circuit 70. The switching circuit 70 is normally a transistor and it is open, however it closes when it receives the pulse 59 from the pulse normalizer 58 through a control line 69 only for the short time corresponding to the pulse width thereof.

Another switching circuit 74, which is similar to switching circuit 70, is connected in parallel with the memory capacitor 72 and it is normally closed, however it opens when the ramp generator 18 produces the output slow ramp signal 19. The switching circuit 74 is controlled by the motor control circuit 20 through a control line 75. An output signal from the memory capacitor 72 is supplied to the slow ramp generator 18 through an input resistor 76. Another input 80, which may be a constant voltage source, is also supplied to the slow ramp generator 18 through another input resistor 78. The common junction of the resistors 76 and 78 is connected to an input terminal of the slow ramp generator 18, which may be a miller integrator consisting of a high gain amplifier 82 and a capacitor 84 connected between the input and output terminals of the amplifier 82. The slow ramp generator 18 produces an output signal proportional to the integration of the signals applied to the input terminal of the amplifier 82 via the input resistors 76 and 78 at the time constant substantially determined by the capacitor 84 and the resistor 76 and by the capacitor 84 and the resistor 78, respectively.

The input resistor 78 is preferably a variable resistor which can be adjusted so that the error signal 67 from the error comparator 66 is minimized. Then the slow ramp signal 19 at an output terminal 88 precisely follows the slope of the reference signal or the staircase output signal 65 from the digital-to-analog converter 64.

As mentioned above, the slow ramp signal 19 having a predetermined maximum amplitude is coupled to the input terminal of the error comparator 66 through a conductor 85. A switching circuit 86, which may be either a conventional electronic switch or a mechanical switch, is connected across the capacitor 84. By a control signal from the motor control circuit 20 via a control line 87, the switching circuit 86 is normally open when the slow ramp generator 18 generates the slow ramp signal 19. On the other hand, the switching circuit 86 is closed to shunt the capacitor 84 when the slow ramp generator 18 does not generate the slow ramp signal 19.

Although a more detailed description will be made hereinafter referring to FIGS. 4 and 5, the slow ramp generator 18 precisely follows the movement of the recording media 12 because of the feedback loop comprising the slow ramp generator 18, the error comparator 66, the error amplifier 68, the memory capacitor 72 and the input resistor 76. The slow ramp signal 19 at the output terminal 88 of the slow ramp generator 18 is applied to the slow ramp control circuit 24.

Figure 3:
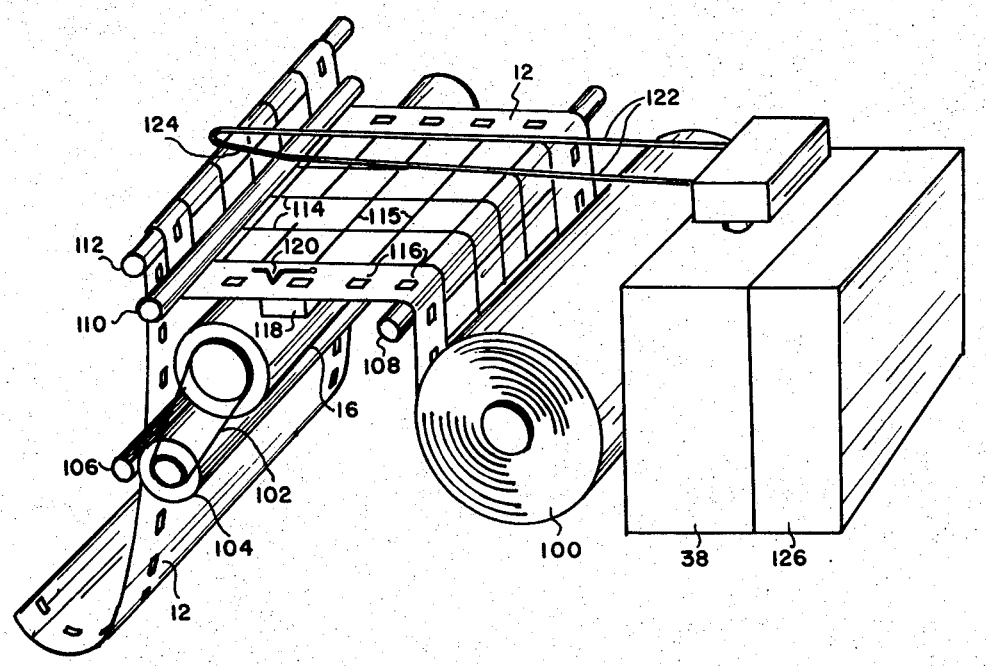
FIG. 3 is a perspective view of a recording mechanism of one embodiment of the present invention and also illustrating another embodiment for deriving pulses corresponding to the movement of the recording media.

FIG. 3 illustrates a recording mechanism of the present invention and also another embodiment of deriving pulses proportional to the movement of the paper 12. The paper 12 is fed from a paper roll 100 loosely mounted in a cabinet (not shown) of the recording mechanism. The paper 12 is inserted between a pinch roller 106 and a driving roller 104 which is coupled to the motor 16 via, for example, a conventional belt 102 so that the paper 12 will be moved. The driving roller 104 is preferably covered by elastic material, such as rubber, to prevent slipping of the paper 12. Rollers 108, 110 and 112 are provided between the paper roll 100 and the paper driving mechanism so that the optimum graph will be obtained.

The paper 12 is a conventional heat sensitive paper having vertical 114 and horizontal 115 lines, each represents a signal magnitude and time duration or length of the coaxial cable 10, respectively. A plurality of holes 116 are provided at least at one side of the paper 12, for example, corresponding to each horizontal line 115. As the time interval or the length is usually measured in reference to the horizontal lines 115, the calibration points should preferably be selected relative thereto.

A conventional switch mechanism consisting of a fixed contact 118 and a movable contact 120 is disposed along the holes 116. This switch 118 and 120 may be used as a switch for the pulse generator 54 in FIG. 2 and produces a pulse train as the paper 12 moves in the horizontal direction.

The pen motor 38 includes a movable arm 122 having, for example, a heat stylus 124 at the end thereof. The heat stylus 124 contacts on the heat sensitive paper 12 just at the portion bent over on the surface of the small roller 112. A box 126 represents electrical circuits, such as a pen movement amplifier, an on-off motor control circuit, a power supply for the heat stylus 124 and an interconnecting device between the recording mechanism and the mainframe of the chart recorder. The number of samples taken by the sampling gate 32 in a second or equivalent to several centimeters of the paper 12 may be selected by adjusting the repetition rate of the fast ramp signal 23, and typically the number of samples is as large as 12,000.

The entire recording mechanism illustrated in FIG. 3 may be provided within a cabinet as a plug-in unit which can be selectably inserted into a plug-in unit compartment in the mainframe of the chart recorder. Although it is not shown in FIG. 3, the front and the top panels of the recording unit may be unitary and mounted by hinge means so that they can be selectably opened to supply or replace the paper roll 100 when necessary. In this case, the pinch roller 106, the roller 110 and the movable switch contact 120 may be mounted in the movable cover member for convenience of operation.

Figure 4:
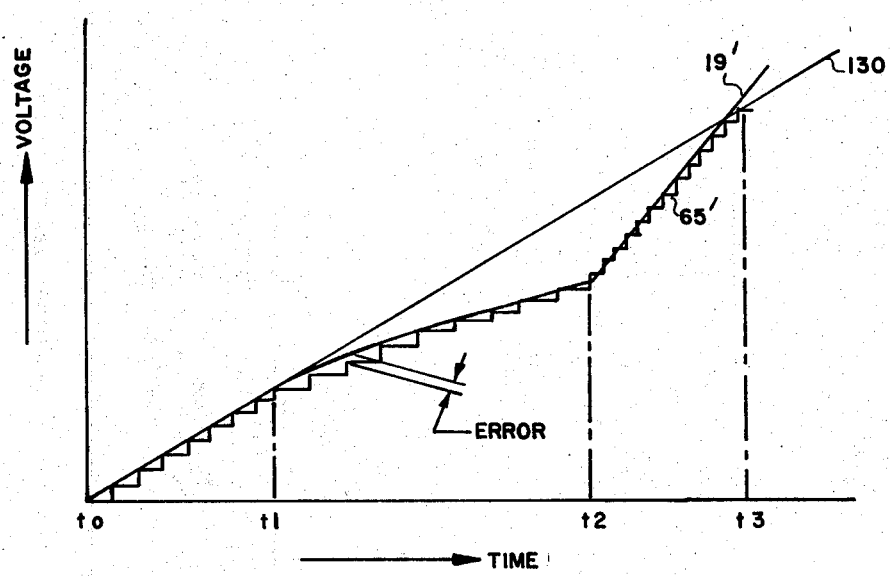
FIG. 4 is a graph of waveforms illustrating the operation of the present invention.

FIGS. 4 and 5 are views of a graph of waveforms illustrating the operation of the slow ramp generator 18 and the error comparator 66, respectively. The horizontal axis represents time, while the vertical axis represents voltage. When the start switch 50 is operated at the time to, the digital-to-analog converter 64 produces the analog staircase signal 65. The staircase signal 65 steps a predetermined incremental amount when the pulse counter 60 receives the pulse 59 from the pulse normalizer 58 and changes the magnitude as a linear function of the movement of the paper 12. However, the motor speed is frequently nonlinear in relation to time because of the static friction of the moving portion of the motor 16, variation of the power source and paper slipperage.

Assuming that the motor 16 operates at the normal speed during during the time $t_0-t_1$, at a slower speed than the normal motor speed during the time $t_1-t_2$ and at a faster speed than the normal motor speed during the time $t_2-t_3$, a curve 65' shows an output staircase signal from the digital-to-analog converter 64. A line 130 shows a slow ramp signal at the terminal 88 of the slow ramp generator 18 at an ideal condition when the error signal 67 from the error comparator 66 is always zero or provides a predetermined normal value.

Referring to FIG. 5 whose horizontal and vertical axes are magnified relative to FIG. 4 to illustrate the operation of the error comparator 66 more clearly, a waveform 67a is an output error signal from the error comparator 66 during the time $t_0-t_1$ when the motor 16 operates at normal speed. As the reference signal to the error comparator 66 is the staircase 65 and the input signal thereto is the slow ramp signal 19, the error output 67 will be a sawtooth signal like 67a. When the pulse normalizer 58 produces the pulse 59a, the output error signal 67a is sampled by the switching circuit 70 and a sample 132a is stored in the memory capacitor 72. Since there is no difference between the staircase signal 65 and the slow ramp signal 19 when the motor 16 operates at the normal speed, the resultant slow ramp signal 19' will follow the ideal line 130 during the time $t_0-t_1$ as illustrated in FIG. 4. When the motor speed is slower than the normal motor speed, the repetition rate of the pulse 59 b is slower than that of 59a and the error signal from the error comparator 66 will assume the form illustrated by waveform 67b in FIG. 5. This causes an error signal 132b to cause the charging rate of the capacitor 84 of the slow ramp generator 18 to decrease to follow the slope of the staircase signal 65'. As the error signal 132b is applied to the input terminal of the slow ramp generator 18 through the input resistor 76, the error signal 132b will be reduced gradually and the slow ramp signal 19' follows the staircase signal 65'. Similarly, an error signal 132c stored in the capacitor 72 increases the charging rate of the capacitor 84 when the motor speed exceeds the normal motor speed during the time $t_2-t_3$.

The slow ramp signal 19' thus derived is applied to the strobe comparator 26 via the slow ramp control circuit 24 as the reference signal thereof in order to obtain strobe pulses 31. By adjusting the amplitude and the dc offset level of the slow ramp signal 19', signals from any desired portions of the coaxial cable 10 can be recorded on the paper 12. As electricity propagates in the transmission lien at enormous speed, only a slight nonlinearity in time of the slow ramp signal 19 causes a great error in the location of the discontinuity of the transmission line when utilized in a measuring instrument of FIG. 1. However, according to the present invention, the slow ramp signal 19 is correctly following the movement of the recording media 12 to eliminate such error. Moreover, differing from a screen of a cathode ray tube oscilloscope, the recording media 12 may be selected long enough to record reflections from a plurality of discontinuities. This ensures the convenient and accurate measurement of the input information. The larger the number of calibrating points of the slow ramp generator 18 with the output from the digital-to-analog converter 64, the more precisely the slow ramp signal 19 follows the staircase signal 65.

Although the above description covers preferred embodiments of the present invention, it will be apparent to those skilled in the art that many changes and modifications may be made without departing from the subject matter thereof. For instance, this invention may be utilized for any kinds of chart recorder or the like, for example a spectrum analyzer, wherein signals corresponding to the movement of the recording media or the driving means are necessary. The recording means may be a conventional pen and ink.

What is claimed is:

1. A ramp generator for a chart recorder or the like for producing a ramp signal which is proportional to movement of a recording media, comprising:
   integrator means for integrating an input signal applied to an input thereof and for producing said ramp signal,
   driving means for driving said recording media,
   detecting means for detecting the speed of recording media,
   converter means for producing an analog signal equivalent to the detection of said detecting means,
   comparator means for comparing outputs from said integrator means and said converter means, and
   feedback means for applying an output error signal from said comparator means to said input of said integrator means for controlling the input signal thereto.

2. A ramp generator for a chart recorder or the like according to claim 1 wherein said detecting means includes a pulse generator for producing pulses according to the movement of recording media, and said converter means includes a pulse counter for counting said pulses and a digital-to-analog converter for converting output from said pulse counter to an analog signal.

3. A ramp generator for a chart recorder or the like according to claim 2 wherein said pulse generator includes switching means actuated in the detection of holes provided at a side of recording media.

4. A ramp generator for a chart recorder or the like according to claim 2 wherein said pulse generator includes switch means for producing pulses in response to the revolution of said driving means.

5. A ramp generator for a chart recorder or the like according to claim 3 wherein said holes are provided in said recording media corresponding to horizontal lines thereof.

6. A chart recorder for recording information on a recording media by sampling means for sampling signals, comprising:
   recording media,
   driving means for moving said recording media, a slow ramp generator for producing a slow ramp signal whose amplitude is proportional to the movement of said recording media, a fast ramp generator for producing a fast ramp signal, comparator means for receiving said slow and fast ramp signals for producing an output signal when said slow and said fast ramp signals coincide with each other, signal sampling means for providing samples of input information in response to said output signal from said comparator means, and recording means for recording said samples of input information on said recording media in accordance with the magnitude of the samples of input information.

7. A chart recorder according to claim 6 wherein a repetitive impulse signal is applied to a transmission line under test and the signal propagation characteristics of said transmission line is sampled and recorded on said recording media.

8. A chart recorder according to claim 6 wherein said recording means includes a recording pen driven in orthogonal direction to the movement of said recording media.

* * * * *